UNITED STATES PATENT OFFICE.

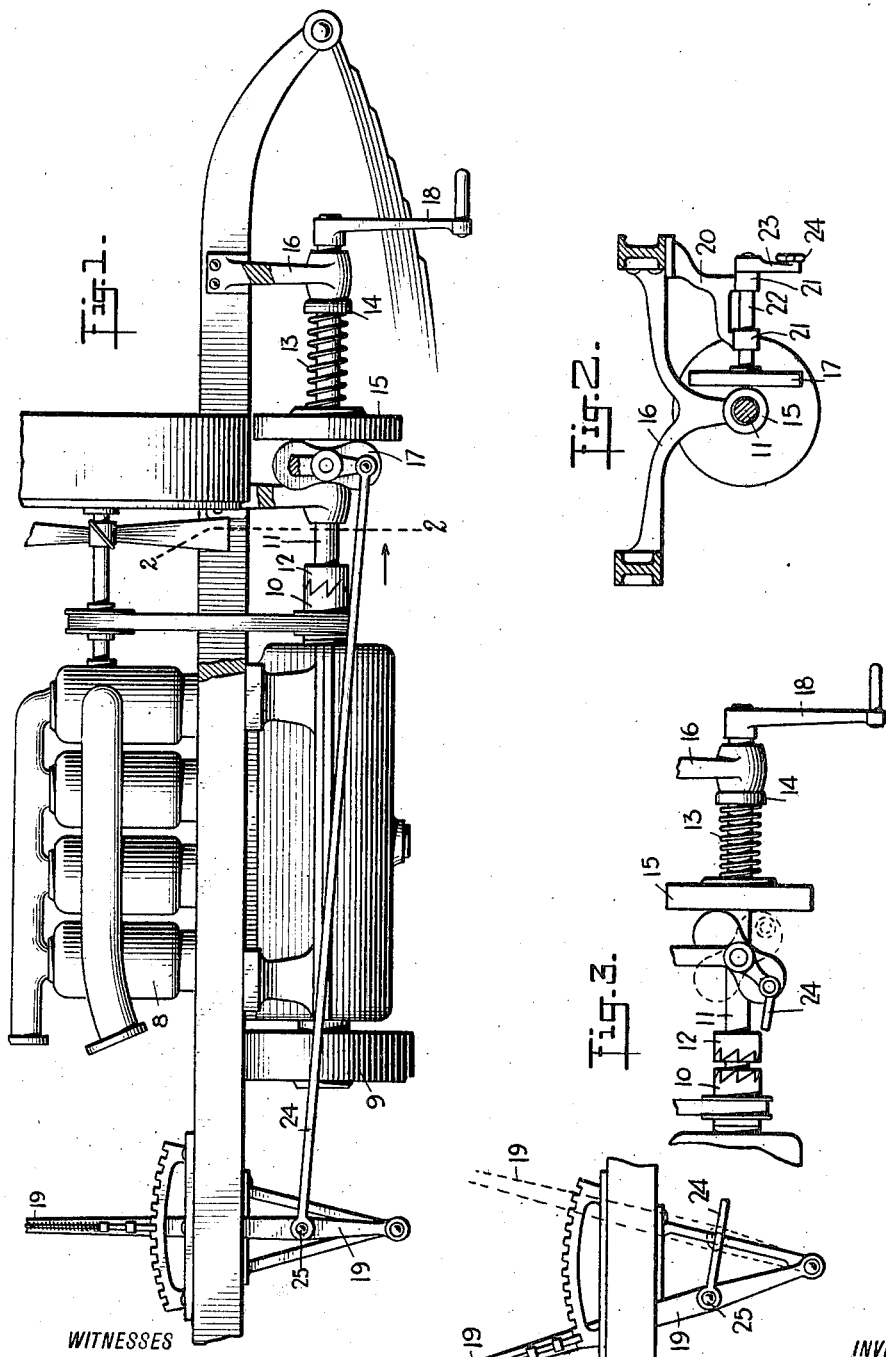

HENRY C. TUNIS, OF NEWARK, NEW JERSEY.

SAFETY ATTACHMENT FOR AUTOMOBILE CRANKING MECHANISM.

1,090,660.  Specification of Letters Patent.  Patented Mar. 17, 1914.

Application filed February 4, 1913. Serial No. 746,170.

*To all whom it may concern:*

Be it known that I, HENRY C. TUNIS, a citizen of the United States, and a resident of Newark, in the county of Essex and State of New Jersey, have invented a new and Improved Safety Attachment for Automobile Cranking Mechanism, of which the following is a full, clear, and exact description.

Among the principal objects which the present invention has in view are: to provide means whereby is rendered impossible the ignition compression in engines of automobiles while the speed gears thereof are in service position; and to provide a simple and efficient mechanism for effecting the above-stated purpose.

One embodiment of the present invention is shown in the accompanying drawings, in which—

Figure 1 is a vertical sectional elevation of an automobile chassis, internal combustion engine therefor, speed gear lever, and cranking mechanism having a safety attachment constructed and arranged in accordance with the present invention; Fig. 2 is a vertical cross section taken on the line 2—2 in Fig. 1; Fig. 3 is a detail view showing the cranking clutch in out-of-service position and the safety attachment for effecting the mentioned disposition of the clutch and the speed lever as connected therewith.

As seen in the accompanying drawings, the crank shaft of the engine 8 is provided at one end with a fly-wheel 9, and at the opposite end with a clutch member 10. The clutch member 10 is suitably constructed to receive the end of a short crank shaft 11, whereon is mounted a clutch member 12. The members 10 and 12 are arranged to lock when moved thereto by a spiral spring 13. The spring 13 is mounted upon the shaft 11, and bears against a thrust plate 14 and the face of a disk 15. The plate 14 may be integrally formed on a bracket 16, or movably connected therewith. The disk 15 is preferably rotatively mounted on the shaft 11, to avoid the drag of the rocking lever 17 upon said disk and upon the crank handle 18. The disk 15 is non-slidably mounted upon said shaft to move the same forward and disconnect the clutch members 10 and 12 whenever the lever 17 is rocked. The lever 17 is operatively connected with a speed lever 19 of a conventional automobile construction. The lever 17 is suitably mounted in a hanging bracket 20, in the bearings 21 whereof is mounted a short shaft 22. At the outer end of the shaft 22 is mounted a crank 23, to which is attached one end of a connecting rod 24. The end of the rod 24 opposite that connected with the crank 23 is pivotally connected with the lever 19 by a pin 25.

As seen in the drawings, the lever 17 is preferably double-ended, each of the ends being extended to form circular surfaces to ride against the face of the disk 15. In the service position of the clutch members 10 and 12, the lever 17 is held with both ends bearing upon the face of the disk 15. In this position of the lever 17, the lever 19 is in its neutral position, wherein the operating clutches and speed gears are in out-of-service position. When, by accident, neglect or otherwise, the lever 19 is moved to place the operating clutch or speed gears of the automobile in service relation, it will be noted that the rod 24 rocks the lever 17 to throw the disk 15, shaft 11 and clutch member 12 forward to disengage the clutch member 12 from the clutch member 10. The spring 13 is compressed by this action, and during the running of the automobile it remains compressed. When, however, the automobile is brought to a rest and the engine stopped, the lever 19 is thrown to the neutral position, which permits the spring 13 to move the shaft 11 and parts connected therewith toward the engine shaft and the clutch member 10, to insure the engagement of the clutch members 10 and 12. If, through neglect, the chauffeur has failed to throw the speed lever 19 to the neutral position, it will be noted that when desiring thereafter to start the engine, it will be found impossible to crank the same, due to the disengagement of the clutch members 10 and 12. Also, if, due to the absence of the chauffeur, the lever 19 has been maliciously interfered with to move the same into position where the gears connected therewith would be in mesh, the intent would be defeated by the fact that the lever 17 would be rocked to disengage the clutch members 10 and 12, thereby rendering it impossible to turn the engine shaft.

While I have herein described the mechanism in its particular detail as shown in the accompanying drawings, it will be understood that the parts thereof may be varied without departing from the spirit of the present invention.

Having thus described my invention, I claim as new and desire to secure by Letters Patent:—

In combination, an automobile having an internal combustion engine, a driving shaft therefor, and a controlling lever; a movable cranking shaft having a clutch to operatively engage said driving shaft; a crank handle rigidly mounted on said cranking shaft; a disk rigidly mounted on said cranking shaft; a spring infolding said cranking shaft to bear against said disk to move said cranking shaft to engage said driving shaft; a double-ended rocking lever disposed adjacent said disk to engage the same to move said cranking shaft out of engagement with said driving shaft; and a connecting rod operatively uniting said controlling lever and said rocking lever, said rocking lever, controlling lever, and connecting rod being arranged to permit the engagement of said cranking shaft and driving shaft only when said controlling lever is in neutral position.

In testimony whereof I have signed my name to this specification in the presence of two subscribing witnesses.

HENRY C. TUNIS.

Witnesses:
CHARLES KOHL,
CHAS. A. BEACH.